United States Patent [19]

Kamiya et al.

[11] Patent Number: 5,305,656
[45] Date of Patent: Apr. 26, 1994

[54] BALANCER APPARATUS FOR ENGINE

[75] Inventors: Tamotsu Kamiya, Susono; Makoto Ishikawa, Mishima; Masaaki Konishi; Keisuke Suga, both of Susono, all of Japan

[73] Assignee: Toyota Jidosha Kabushiki Kaisha, Aichi, Japan

[21] Appl. No.: 83,833

[22] Filed: Jun. 25, 1993

Related U.S. Application Data

[62] Division of Ser. No. 807,051, Dec. 12, 1991, abandoned.

[30] Foreign Application Priority Data

| | | | |
|---|---|---|---|
| Dec. 21, 1990 | [JP] | Japan | 2-405212 |
| Dec. 25, 1990 | [JP] | Japan | 2-401715[U] |
| Dec. 28, 1990 | [JP] | Japan | 2-417348 |
| Dec. 28, 1990 | [JP] | Japan | 2-417350 |
| Feb. 13, 1991 | [JP] | Japan | 3-20045 |
| Apr. 16, 1991 | [JP] | Japan | 3-84233 |

[51] Int. Cl.⁵ .................... F16C 3/04; F16C 11/00
[52] U.S. Cl. ........................ 74/604; 123/192.2; 74/603
[58] Field of Search .......... 74/603, 604, 605, 591, 74/573 R; 123/192.1, 192.2, 195 C, 195 H

[56] References Cited

U.S. PATENT DOCUMENTS

| | | | |
|---|---|---|---|
| 1,164,367 | 12/1915 | Lanchester | 74/604 |
| 1,658,772 | 2/1928 | Taub | 74/604 |
| 1,898,459 | 2/1933 | Newcomb | 74/604 |
| 3,511,110 | 5/1970 | Grieve | 74/604 |
| 3,667,317 | 6/1972 | Hillingathner | 74/604 |
| 3,710,774 | 1/1973 | Weseloh et al. | 74/604 X |
| 4,320,671 | 3/1982 | Curasi | 74/604 |
| 4,465,029 | 8/1984 | Matsumoto | 74/606 R X |
| 4,703,725 | 11/1987 | Weertman | 123/192.2 |
| 4,741,303 | 5/1988 | Kronich | 123/192.2 |
| 4,802,450 | 2/1983 | Roberts | 74/604 X |

FOREIGN PATENT DOCUMENTS

| | | | |
|---|---|---|---|
| 56-122848 | 9/1981 | Japan . | |
| 61-47140 | 3/1986 | Japan . | |
| 62-194052 | 8/1987 | Japan | 74/604 |
| 63-53943 | 4/1988 | Japan . | |

*Primary Examiner*—Vinh T. Luong
*Attorney, Agent, or Firm*—Kenyon & Kenyon

[57] ABSTRACT

A balancing apparatus for suppressing engine vibrations is disclosed. The balancer apparatus includes a helical drive gear that is rotatable together with the crank shaft. A first driven helical gear for is driven by the drive gear and a second driven helical gear is driven by the first driven gear. Support shafts are provided to carry each of the driven gears and a weight associated therewith. A case is provided about the driven gears and carries the support shafts.

7 Claims, 14 Drawing Sheets

BALANCER APPARATUS FOR ENGINE

This application is a division of application Ser. No. 07/807,051, filed on Dec. 12, 1991, now abandoned.

BACKGROUND OF THE INVENTION

1. Field of the Invention

The present invention relates to a balancer apparatus for an engine. More particularly, the invention relates to a balancer apparatus which cancels out inertial force and/or inertial couple induced by the pistons, connecting rods and the like when the engine is running to thereby suppress or reduce vibration of the engine.

2. Description of the Related Art

When individual movable portions of an engine such as an automobile engine become off balance during operation of the engine, vibration occurs. Such vibrations generate noise and wear out or damage individual bearings. To overcome this shortcoming, a balancer is typically used to cancel the inertial force or inertial couple of the piston, the connecting rod, and the like to reduce the vibration of the engine.

A conventional balancer apparatus of this type is disclosed in, for example, U.S. Pat. No. 3,667,317. As shown in FIGS. 20 and 21, this balancer apparatus applies vibration suppressing force to a crank shaft 101. More specifically, a drive gear 103 is attached to an crank arm 102. A balancer case 105 having a rectangular frame is secured to a cylinder block below the drive gear 103.

A pair of support shafts 106 and 107 are secured across the balancer case 105. First and second driven gears 108 and 109 are rotatably supported on the support shafts 106 and 107. Similarly, first and second weights 110 and 111 supported by the respective shafts via bushings 112 and 113 respectively. Both weights 110 and 111 are attached such that they are rotatable together with the respective driven gears 108 and 109. The drive gear 103 engages the first driven gear 108, which in turn engages the second driven gear 109. Accordingly, rotation of the crank shaft 101 is transmitted to the drive gear 103, to the first driven gear 108, and then to the second driven gear 109. Thus, as the first and second weights 110 and Ill rotate, a load to suppress the vibration of the engine acts on the crank shaft 101.

Efforts are continually being made to reduce the size of individual engine components and the balancer apparatus is no exception. As one means to make the balancer more compact, the weights 110 and 111 may be disposed in close proximity to the crank shaft 101. However, the weights 110 and 111 can not be arranged too close to the crank shaft 101, since they would interfere with the movement of connecting rod 114.

In another design modification, a counter weight 115 may be formed on the crank arm 102, as indicated by a double-dot chain line in FIG. 20, In this case the weight 110 (111) interferes with the counter weight 115. To prevent the interference of the weight 110 (111) with the counter weight 115 or connecting rod 114, the weight 110 (111) needs to be provided in close proximity to the crank shaft 101. This restricts the horizontal length of the weight 110 (111).

In addition, because of the use of spur gears as the drive gear 103 and the driven gear 108 (109), these gears become thick. The ratio of the axial length of the weight 110 (111) to the sum of the axial length of the weight I 10 (1 I 1 ) and the axial length of the driven gear 108 (109) is therefore reduced. As the balancer apparatus is made more compact, the weights 110 and 111 will become too small to provide good vibration damping due to those restrictions.

Further, it is necessary to supply lubricating oil to the bushings 112 and 113 between the weights 110 and Ill and the support shafts 106 and 107 to smoothen the rotation of the weights 110 and 111. This balancer apparatus is not, however, provided with a means to supply lubrication oil to the bushings 112 and 113. Thus, the vibration reducing effect of weights 110 and ill is diminished.

In the above balancer apparatus, the bushings 112 and 113 are plate members that are bent so that their edges are bonded to each other. Thus, when the bushings 112 and 113 are installed into the respective support holes 116 and 117 of the weights 110 and 111, the juncture of the edges may damage the peripheral surfaces of the support shafts 106 and 107.

In order to reduce both the noise and wear created by the engagement of drive gear 103 and the first driven gear 108, there is a known method of supplying lubrication oil to the point where these gears contact. However, a change in the rotation of the crank shaft 101 displaces the drive gear 103. This method does not consider the influence of the displacement on the contact point between the drive gear 103 and the driven gear 108 when the rotational direction of the drive gear switches. Therefore, there is still a pending question as to how to effectively reduce a gear-hitting sound caused by a change in the rotation of the crank shaft 101.

Furthermore, unless the gap between the drive gear 103 and the driven gear 108 is held correctly at the designed value, a load which is applied to the crank shaft 101 to reduce the vibration of the engine would become insufficient, or backlash would occur. To keep the accurate gap between the gears 103 and 108, it is necessary to improve the working precision of that surface of the balancer case 105 which is to be attached to the cylinder block 104, or install a shim between the attaching face and the cylinder block 104. However, such countermeasures require much time and labor and require a plurality of shims with different thicknesses, thus increasing the manufacturing cost.

In addition, it is necessary to secure the support shafts 106 and 107 unrotatable to the balancer case 105 to avoid unnecessary friction therebetween. Accordingly, the support shafts 106 and 107 are generally pressed into the respective holes provided in the balancer case 105. It is, however, desirable that the balancer case 105 be made of a light alloy to become lighter, while the support shafts 106 and 107 should be formed of steel to keep the sufficient strength. While the engine is warmed, the difference between the coefficient of thermal expansion of the balancer case 105 and that of the support shafts 106 and 107 may form a gap therebetween, resulting in displacement of the center of each support shaft. In this regard, the support shafts 106 and 107 may be made of a material with a larger coefficient of thermal expansion than that of the balancer case 105. This method would, however, cause the support shafts 106 and 107 to overexpand, which may crack the balancer case 105.

SUMMARY OF THE INVENTION

It is therefore a primary object of the present invention to provide an improved balancer apparatus for an engine, which runs smoothly and is capable of suppressing noise and vibrations when the engine is running.

It is a further object of this invention to provide a balancer apparatus for an engine which has a long service life and functions well regardless of differences in the coefficients of thermal expansion between different components.

In order to achieve the foregoing and other objects of the invention, a balancer apparatus is provided to suppress engine vibrations. The balancer apparatus includes a helical drive gear that is rotatable together with the crank shaft. A first driven helical gear is driven by the drive gear and a second driven helical gear is driven by the first driven gear. Support shafts are provided to carry each of the driven gears and a weight associated therewith. A case is provided about the driven gears and carries the support shafts.

In a preferred embodiment a bushing is journaled about each support shaft to carry its associated driven gear and weight. Each bushing is formed from a rolled plate having end portions that are joined together. The joined end portions are each beveled such that each bushing has a chamfer at an interior surface of the joint region.

In a separate preferred embodiment of the invention, the case is made of a material having a higher coefficient of thermal expansion than the first and second support shafts. Support shaft bushings formed of a shape memory alloy are provided to secure the support shafts to the case. The support shaft bushings expand and deform into a noncylindrical shape when the engine is warm.

In another separate preferred embodiment, each of the support shafts has a first portion that is attached to the case and a second portion that carries its associated weight. The axial centers of the first and second shaft portions are offset such that they are eccentric.

DETAILED DESCRIPTION OF THE PREFERRED EMBODIMENTS

Figure 1:
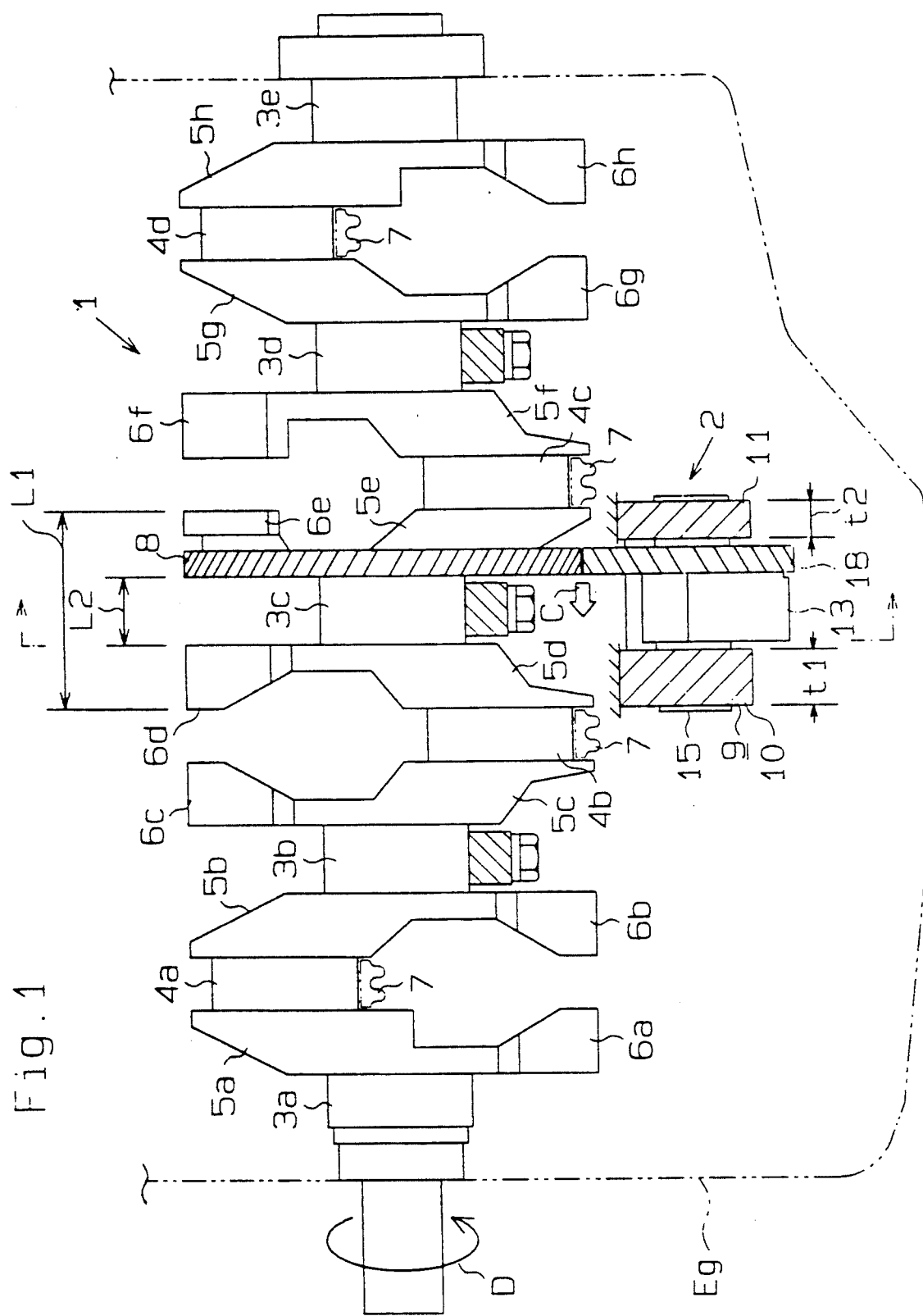
FIG. 1 is a front view, partially cut away in cross section, illustrating a crank shaft and a balancer apparatus according to a first embodiment of the present invention.

One preferred embodiment of the present invention will now be described referring to FIGS. 1 to 6. FIG. 1 illustrates the arrangement of a crank shaft 1 and a balancer apparatus 2 in a four-cylinder engine Eg for automobiles. The crank shaft 1 converts the reciprocal movement of a piston into a rotational movement to provide power. The crank shaft 1 comprises first to fifth crank journals 3a to 3e, first to fourth crank pins 4a to 4d, first to eighth crank arms 5a to 5h, and first to eighth counter weights 6a to 6h.

The crank shaft 1 is, rotatably supported relative to a cylinder block in the direction of the arrow D, together with the crank journals 3a to 3e. The crank shaft 1 has a crank pulley 20 at its front end and a flywheel 21 at its rear end (see FIGS. 4 to 6). A connecting rod 7 is coupled to each of the crank pins 4a to 4d. FIG. 1 shows only the bottom end of the connecting rod 7 for the sake of convenience.

A drive gear 8 is fixed coaxially to the third crank journal 3c at the front portions of the fifth crank arm 5e and the fifth counter weight 6e. The drive gear 8 comprises a helical gear having torsion in the left direction (as seen in Figure 1).

The helical gear has wider and thicker teeth and a greater working rate than those of a spur gear if both gears are of equal thickness and diameter. The helical gear is therefore stronger than the spur gear. Further, the helical gear rotates more smoothly than the spur gear, so that noise caused by the gear engagement is low.

Figure 3:
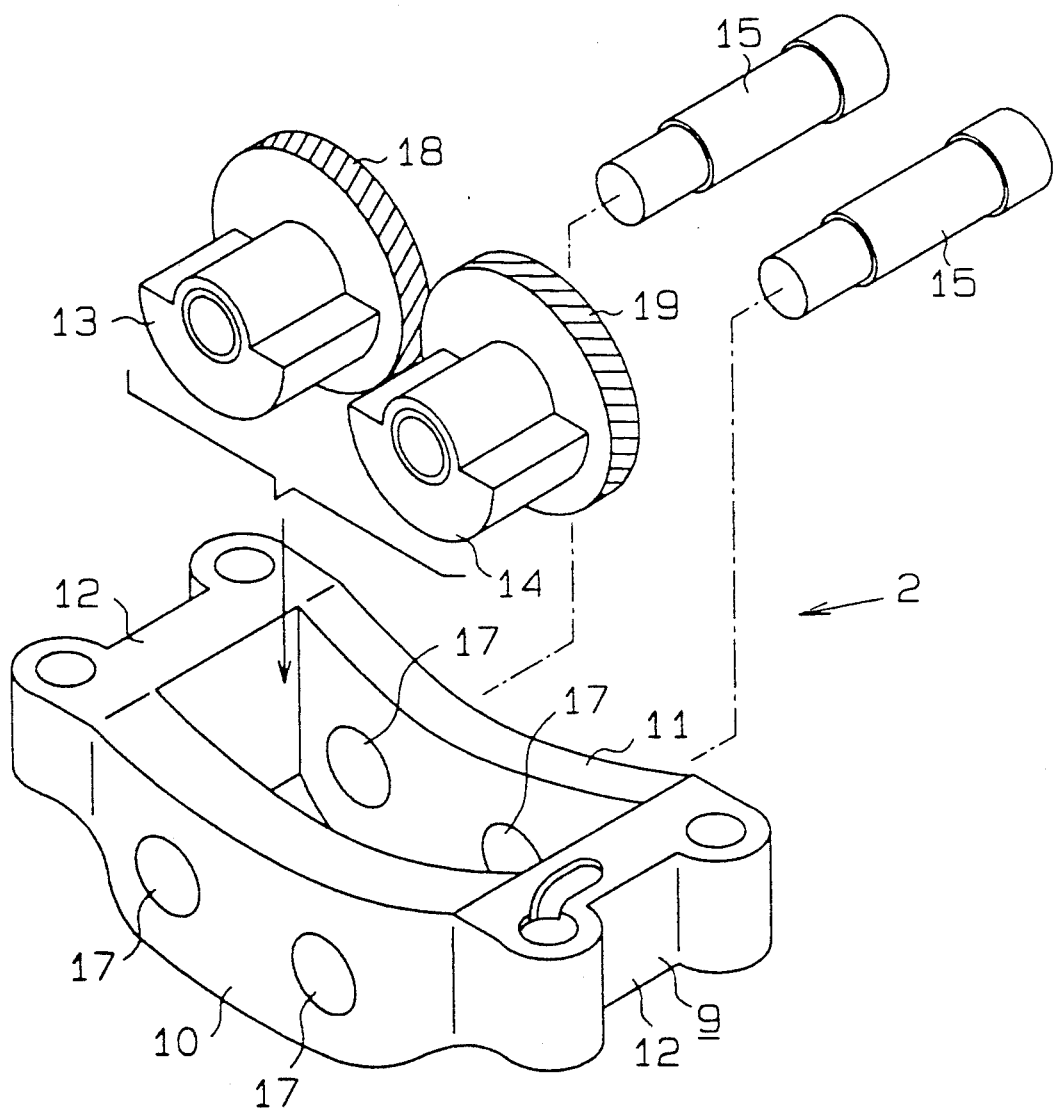
FIG. 3 is an exploded perspective view of the balancer apparatus.

The balancer apparatus 2 is placed in the lower vicinity of the drive gear 8. As shown in FIG. 3, a case 9 of the balancer apparatus 2 includes a first wall which may be a horizontally elongated plate 10, a second wall which may be a horizontally elongated plate 11 and a pair of end walls which may be formed of coupling plates 12. The coupling plates 12 couple both ends of the plates 10 and 11 to form a rectangular ring shape.

The four corners of the case 9 are fixed to a cylinder block B by bolts (not shown).

As shown in FIG. 1, the front surface of the front plate 10 is positioned at substantially the same level as the front surface of the fourth counter weight 6d. The rear surfaces of the rear plate 11 and the fifth counter weight 6e are positioned at substantially the same level with each other. The case 9 is therefore located within space of the axial length L1 between the fourth and fifth counter weights 6d and 6e. Further, according to this embodiment, a thickness t1 of the front plate 10 is set greater than a thickness t2 of the rear plate 11.

In the case 9 as shown in FIG. 3, first and second weights 13 and 14 are supported rotatably on first and second support shafts 15 and 16, respectively. Both ends of each of the support shafts 15 and 16 are fitted nonrotatably into a pair of holes 17 formed through the front and rear plates 10 and 11. The first and second weights 13 and 14, which are almost semi-columnar are rotatably secured to the support shafts 15 and 16 respectively by means of bushings 22 and 23.

Figure 2:
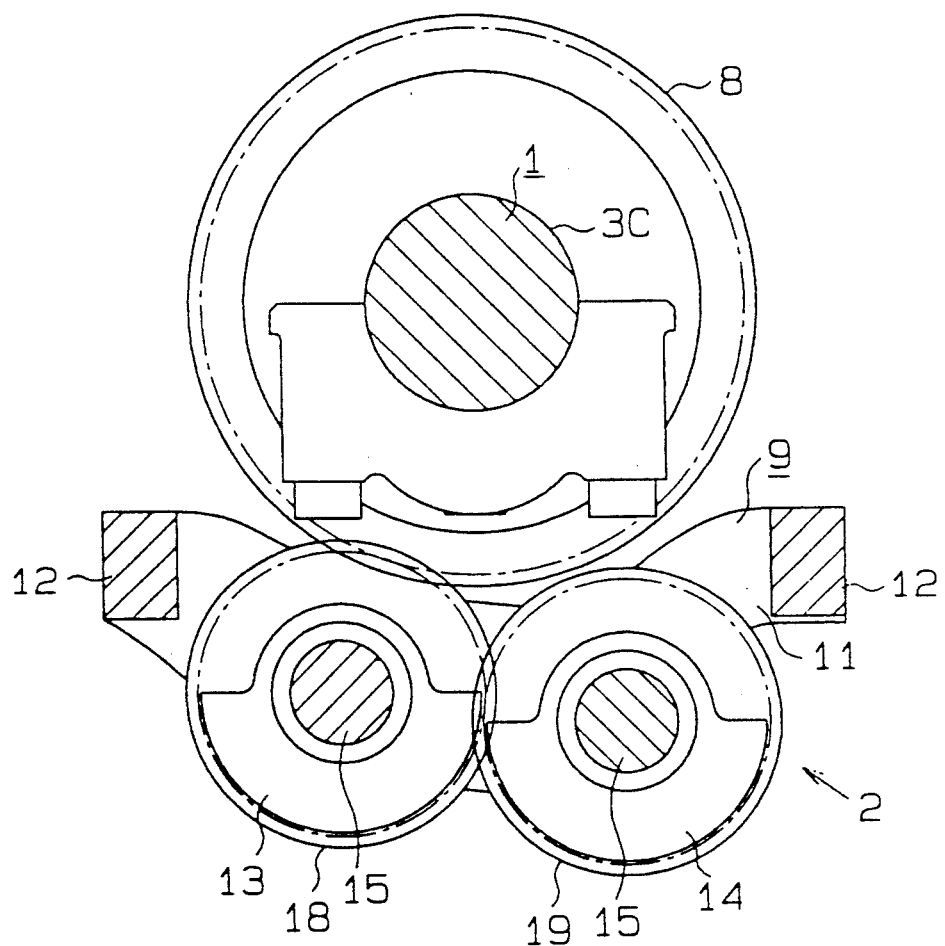
FIG. 2 is a cross section taken along the line II—II in FIG. 1.

First and second driven gears 18 and 19 which are smaller than the drive gear 8 in diameter, are securely fitted over the rear portions of the weights 13 and 14. The driven gears 18 and 19 are rotatable respectively around the support shafts 15 and 16, together with the associated weights 13 and 14. The driven gears 18 and 19, like the drive gear 8, are helical gears. The first driven gear 18 has right torsion, while the second driven gear 19 has left torsion. As shown in FIG. 2, the first driven gear 18 and the drive gear 8, and the first and second driven gears 18 and 19 are engaged, respectively. With the gears engaged with each other, the weights 13 and 14 are placed within the space of the front-to-rear length L2 of the third crank journal 3c as shown in FIG. 1.

In the balancer apparatus with the above structure according to this embodiment, the rotation of the crank shaft 1 is transmitted to the first driven gear 18 through the drive gear 8 to rotate the first weight 13. The rotation of the first driven gear 18 is transmitted to the second driven gear 19 to rotate the second weight 14. The rotation of the weights 13 and 14 generate a load direct such that the inertial force or inertial couple caused by the piston, the connecting rod 7, etc. is canceled. A This load reduces vibration of the crank shaft 1.

Figure 4:
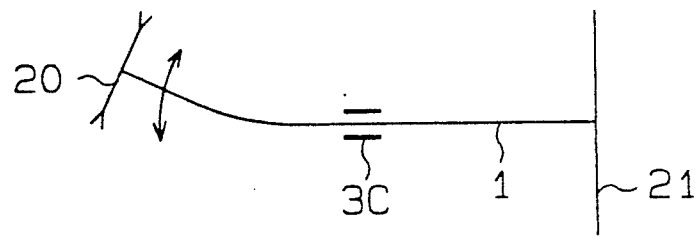
FIG. 4 is a schematic diagram illustrating the bending vibration mode of the crank shaft at 450 Hz.
Figure 5:
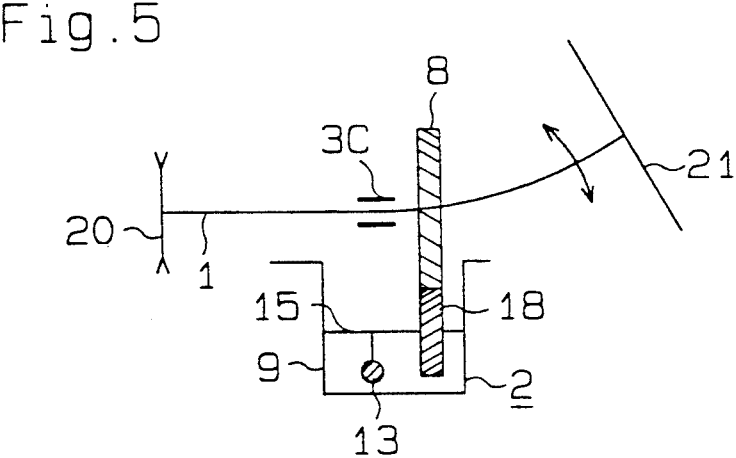
FIG. 5 is a schematic diagram illustrating the bending vibration mode of the crank shaft at 200 Hz.

There are two types of vibrations in the crank shaft 1. They include bending vibration and torsional vibration. FIG. 4 schematically shows the bending vibration mode of the crank shaft 1 at 450 Hz. FIG. 5 schematically illustrates the bending vibration of the crank shaft 1 at 200 Hz. At 450 Hz the front portion of the crank shaft 1 (left-side portion in the drawing) vibrates up and down, as indicated by the arrows. The rear portion of the crank shaft 1 (right-side portion in the drawing) likewise vibrates up and down as indicated by the arrows at 200 Hz. It is apparent in either case that the amplitude of the vibration of the crank shaft 1 near the third crank journal 3c is small. The vibration occurring at the cylinder block near this journal 3c is also small.

Suppose that the drive gear 8 is attached to that portion of the crank shaft 1 which causes large bending vibration, for example, to the front end or rear end of the shaft 1. Further suppose that the case 9 and the weights 13 and 14 are provided in the vicinity of the drive gear 8. Then, the drive gear 8 would rotate while vibrating significantly. This vibration changes the backlash between the drive gear 8 and the first driven gear 18, thus increasing the gear hitting sound and friction therebetween.

According to this embodiment, however, the drive gear 8 is attached to the front portion of the fifth counter weight 6e provided at the center portion of the crank shaft 1. Even when bending vibration occurs on the shaft 1, the vibration of the drive gear 8 while rotating is small. Further, the front and rear, horizontally elongated plates 10 and 11 of the case 9 are disposed within the space of the front-to-rear length L1 of the fourth and fifth counter weights 6d and 6e, i.e., at the location corresponding to the center portion of the shaft 1. The vibration of the case 9 is therefore small, and the vibration of the driven gears 18 and 19 attached to the case 9 while rotating is also small. In particular, the center distance between the drive gear 8 and the first driven gear 18 is kept nearly constant, thus suppressing any potential increases in the gear hitting sound or wear caused by a change in the backlash.

Furthermore, the first and second weights 13 and 14 are provided within the space of the front-to-rear length L2 of the third crank journal 3c. Therefore, neither of the weights 13 and 14 interfere with the fourth and fifth counter weights 6d and 6e when rotating. This increases the space for the individual weights 13 and 14 to rotate, thus permitting the radius of the weights 13 and 14 to be set relatively long.

In addition, because helical gears are used as the drive gear 8 and both driven gears 18 and 19, the gears need a smaller thickness than spur gears for the same torque transmission. This allows both weights 13 and 14 to have a longer front-to-rear length accordingly, The weights 13 and 14 can therefore be designed to be longer in the radial direction as well as the axial direction, and have a high weight efficiency.

Figure 6:
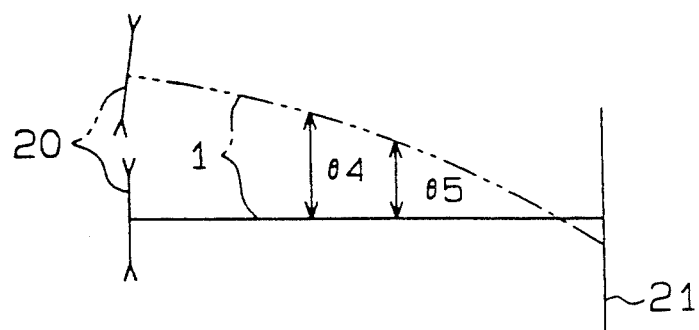
FIG. 6 is a schematic diagram illustrating the torsional vibration mode of the crank shaft at 450 Hz.

When the engine is running, the crank shaft 1 not only causes bending vibrations, but also generates torsional vibration. FIG. 6 schematically illustrates the torsional vibration mode of the crank shaft 1 at 450 Hz. It is apparent from this diagram that the amplitude $\theta 5$ of the fifth counter weight (6e) portion is smaller than the amplitude $\theta 4$ of the fourth counter weight (6d) portion. As mentioned previously, since the drive gear 8 is attached to the front portion of the fifth counter weight 6e, the drive gear 8 has a smaller rotational change as compared to the case where this gear 8 is attached in front of the fourth counter weight 6d. It is therefore possible to reduce the thrust sound caused secondarily between the first weight 13 and the balancer case 9 due to the gear hitting sound and the rotational change.

Further, according to this embodiment, the front, horizontally elongated plate 10 of the balancer case 9 is made thicker than the rear, horizontally elongated plate 11 to have a higher stiffness. The reason why the front plate 10 can be made thicker is as follows.

According to this embodiment, the drive gear 8 is located at the front portion of the fifth counter weight 6e or the rear portion of the journal 3c. Further, the case 9 is disposed within the space of the front-to-rear length L1 of the fourth and fifth counter weights 6d and 6e. Furthermore, both weights 13 and 14 are provided within the space of the length L2 of the third crank journal 3c within the case 9. In addition, the driven gears 18 and 19 are located further back from the weights 13 and 14.

It therefore becomes necessary to make the rear plate 11 of the case 9 thinner by the thickness of the driven gears 18 and 19, and the front plate 10 could be made thicker than the rear plate 11. Although the front plate 10 will have larger torsional vibration than the rear plate 11, the adverse effect of the torsional vibration can be suppressed.

Further, according to this embodiment, the drive gear 8 and both driven gears 18 and 19 are helical gears, so that they have a higher working rate than spur gears, thus ensuring reduction of the gear-hitting sound.

When the first driven gear 18 rotates, the thrust force directed toward the front of the shaft 1 acts on the driven gear 18 as indicated by the arrow C in FIG. 1, making the weight 13 hit against the front plate 10 of the case 9. As the stiffness of the front elongated plate 10 is improved as mentioned earlier, the first weight 13 is received by the front plate 10, preventing the plate 10 from being deformed.

The drive gear 8 may be attached to the rear portion of the fourth counter weight 6d instead of the fifth counter weight 6e in this embodiment. In this case, the front plate 10 of the case 9 should be made thinner, and the driven gears 18 and 19 should be secured to the front portions of the respective weights 13 and 14. It is preferable that the rear plate 11 of the case 9 be made thicker and the torsional direction of the drive gear 8 and the first driven gear 18 be reversed to the direction in this embodiment, thereby causing the rearward thrusting force.

Figure 7:
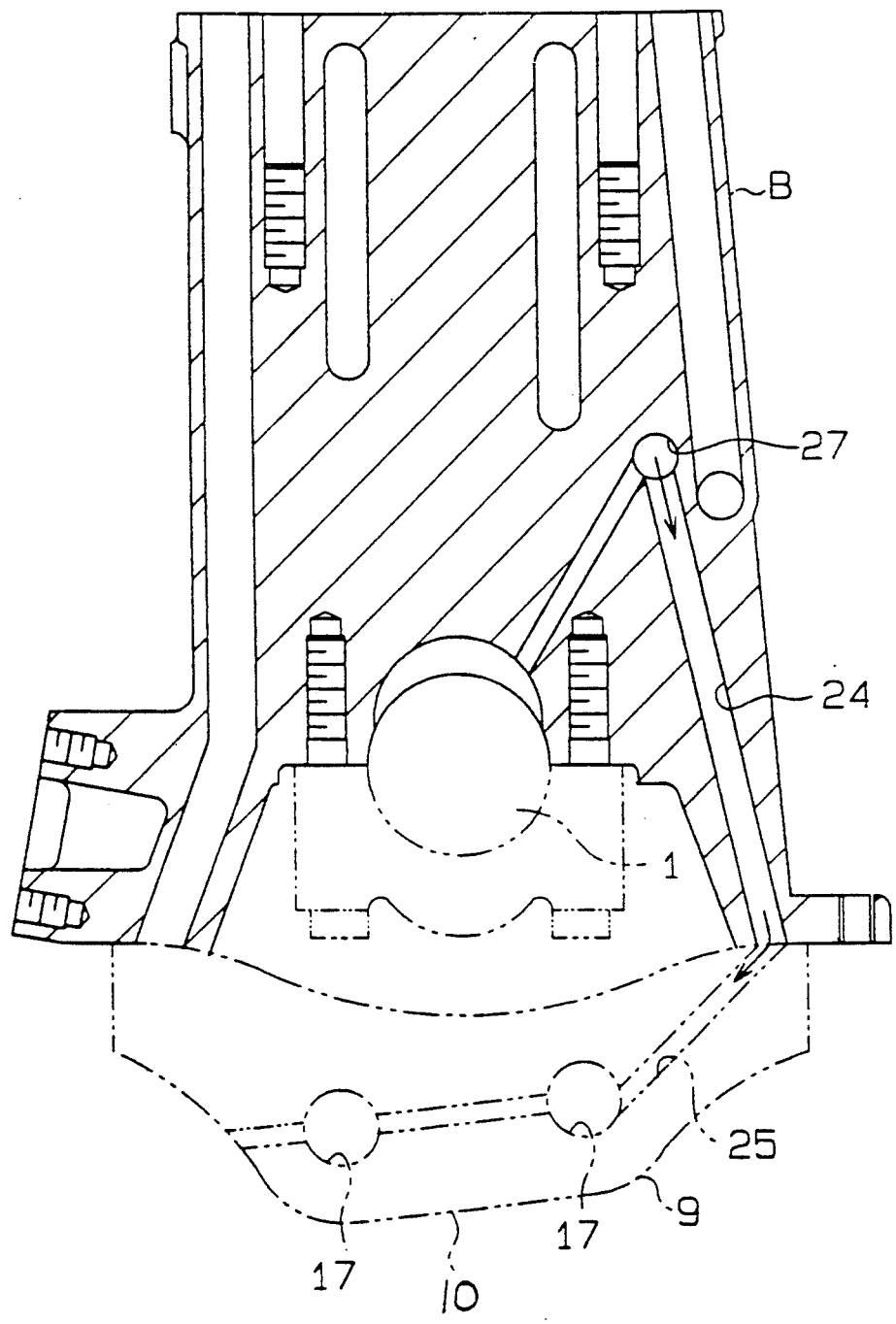
FIG. 7 is a front view, partially cut away in cross section, illustrating a conventional crank shaft and a balancer apparatus according to a second embodiment of the present invention.
Figure 8:
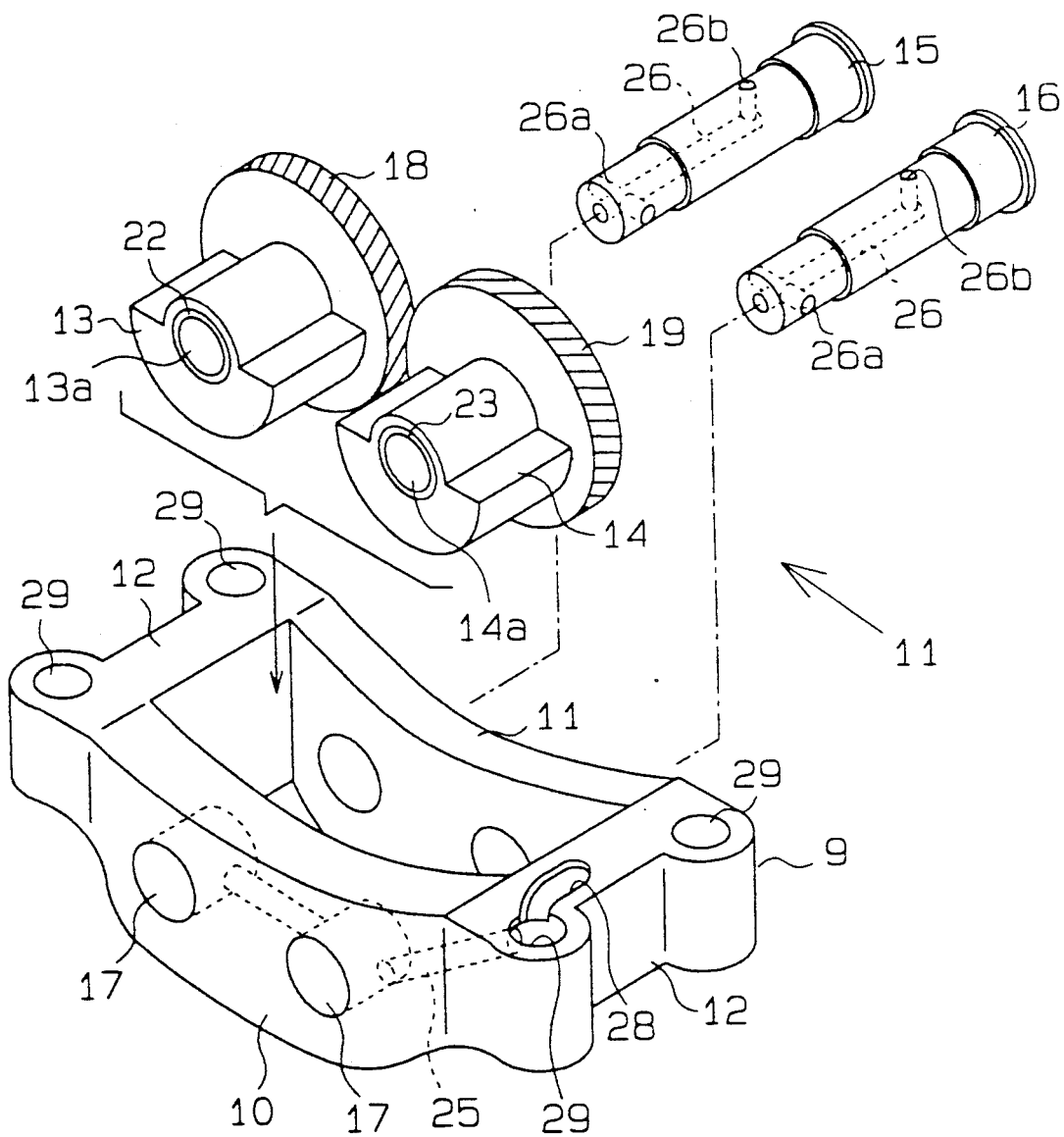
FIG. 8 is an exploded perspective view of the balancer apparatus according to the second embodiment.

A second embodiment of the present invention will now be described referring to FIGS. 7 and 8. According to the second embodiment, an oil supply path is provided to feed a lubrication oil between the bushings 22 and 23 and the balancer apparatus support shafts 15 and 16. This oil supply path includes a first passage 24, a second passage 25 and third passages 26 formed respectively in the cylinder block B, the case 9 and the support shafts 15 and 16. More specifically, as shown in FIG. 7, the first passage 24 branched from an oil passage 27 of the cylinder block B is open to the bottom of the cylinder block B. The opening of the first passage 24 communicates with the second passage 25 via a guide groove 28 and a bolt hole 29 both formed in the top of the case 9. The second passage 25 communicates with the holes 17 of the front plate 10 of the case 9. The third passages 26 in the support shafts 15 and 16 communicate with the respective holding holes 17 and support holes 13a and 14a via front and rear branched passages 26a and 26b. Consequently, oil from the oil passage 27 of the cylinder block B is supplied through the first to third passages 24 to 26 to the bushings 22 and 23 in the support holes 13a and 14a. This improves the lubrication effect of the bushings 22 and 23.

Figure 9:
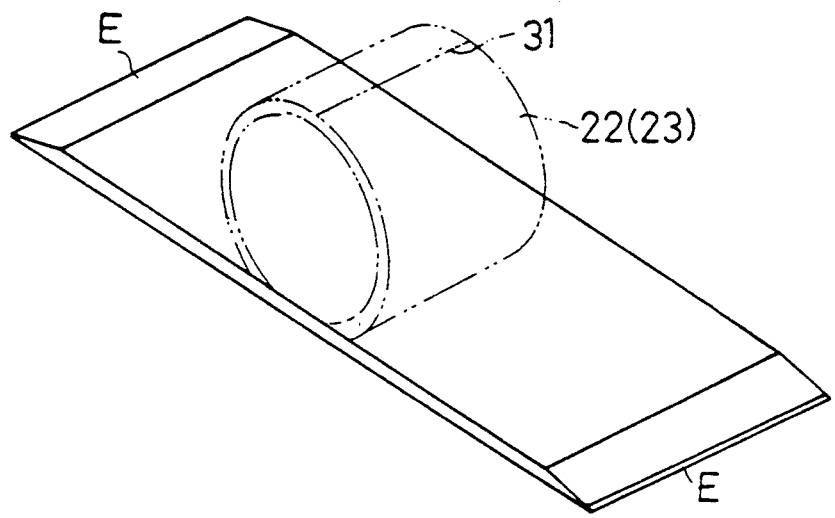
FIG. 9 is a perspective view illustrating how a bushing is made according to a third embodiment of the present invention.
Figure 10:
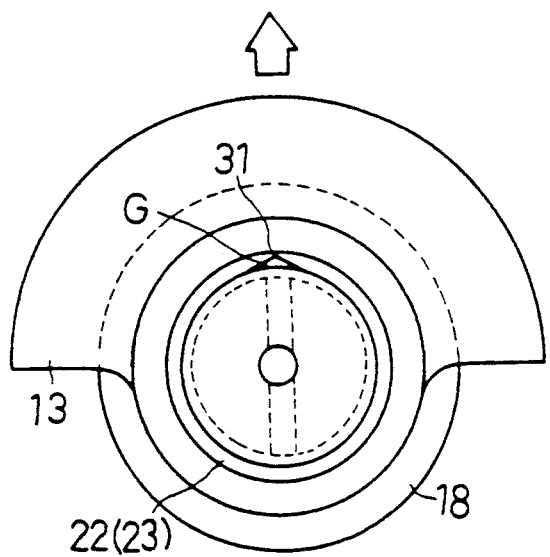
FIG. 10 is a front view of a driven gear and a weight, using the bushing.

A third embodiment of the present invention will now be described referring to FIGS. 9 and 10. According to this embodiment, the bushings 22 and 23 have a longitudinally extending chamfer on their inner surface. As shown in FIG. 9, the bushings 22 and 23 are formed from rolled plates, Before rolling, each end of the plate is beveled. The plate members are then wound such that the beveled portions E meet at a joint 31 to form the longitudinally extending chamfer on the inner surface of the bushing. The chamfer forms an oil groove G on the inner surface of the bushing.

As indicated above, the joint 31 between the opposing ends of the bushing is indented somewhat and therefore will no contact the outer surfaces of the support shafts 15 and 16. This overcomes the conventional problem in rolled bushings that a protrusion may be formed in the joint region. Such a protrusion can contact the outer surface of the associated support shaft thereby damaging it. The feature of this embodiment can improve the durability of the support shafts 15 and 16 and can thus prolong the life of the balancer apparatus.

According to this embodiment, a circular groove 32 is formed in the outer surface of each of the support shafts 15 and 16. The oil from the oil passage 27 of the cylinder block B reaches the circular grooves 32 through the first to third passages 24 to 26 to form an oil film at the slidably contacting portions between the bushings 22 and 23 and the outer surfaces of the respective support shafts 15 and 16. The clearance G serves as an oil reservoir and the oil flowing into the oil groove G from the circular groove 32 is always fed to the slidably contacting portions. This prevents the bushings 22 and 23 from being burnt by the dry-out of the oil film.

A fourth embodiment of the present invention will now be described referring to FIGS. 11 through 15. In this embodiment, the gear-hitting sound created at the point that the drive gear 8 and the first driven gear 18 engage each other, is reduced in accordance with a change in the rotational speed of the crank shaft 1.

Figure 11:
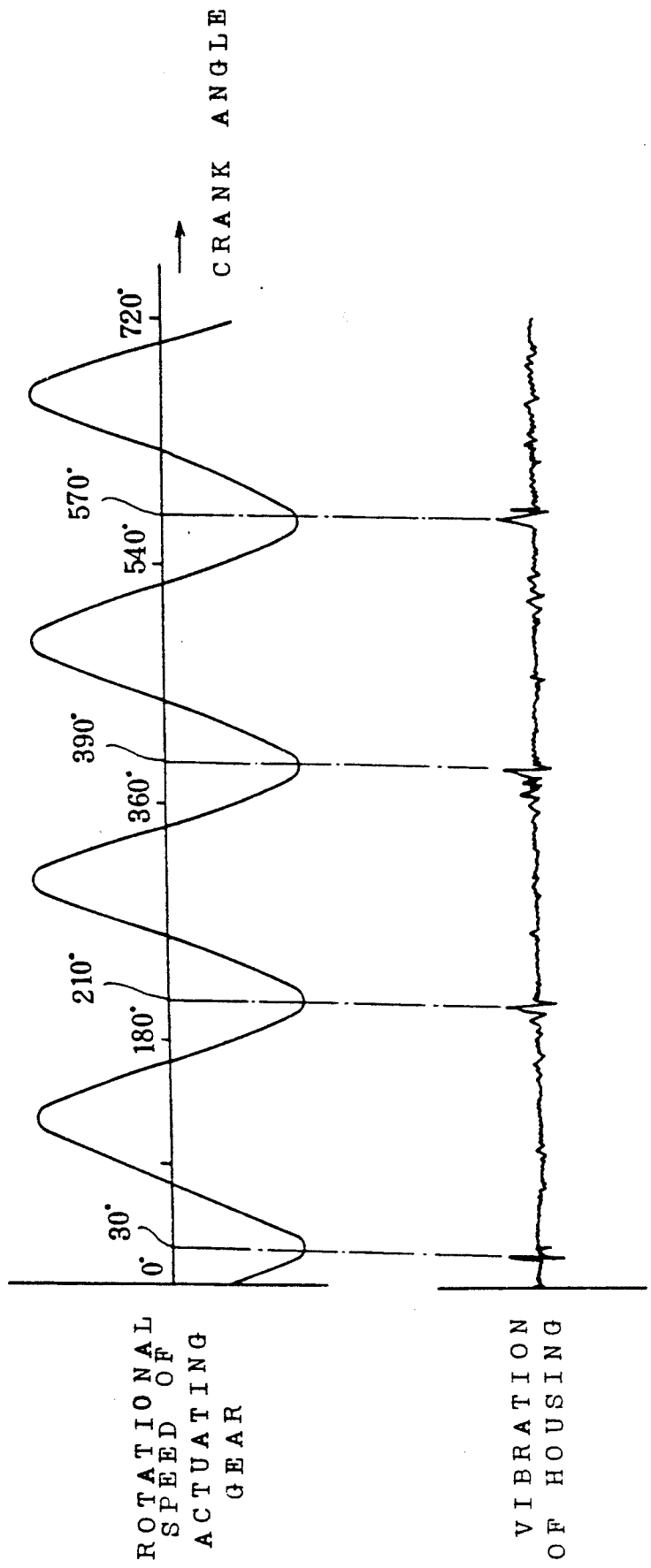
FIG. 11 is a chart showing the relation between a change in crank angle and a change in the rotation of a drive gear, caused in one engine cycle, according to a fourth embodiment of the present invention.
Figure 12:
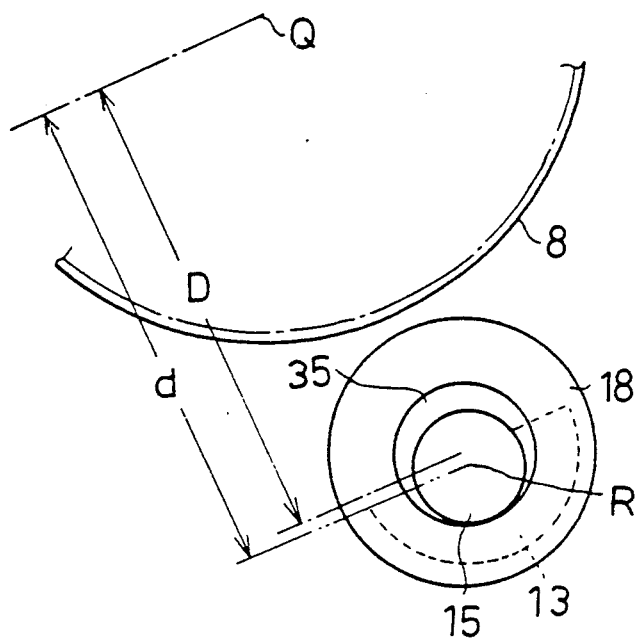
FIG. 12 is a schematic diagram illustrating the supporting portion of a support shaft when the drive gear is at its minimum rotational speed.

When the engine runs at a low speed, the rotational speed of the crank shaft 1 varies a small amount over the course of a cycle. This variation is called the secondary frequency of rotation and is shown in FIG. 11. These small rotational speed variations are caused by the explosions and compressions taking place in the combustion chamber. Since the rotational speed of the crank shaft varies, the rotational speed of the drive gear 8 varies in exactly the same way.

When the rotational speed of the drive gear 8 speeds up and slows down in accordance with these secondary variations, the teeth of the drive gear 8 strike the teeth of the first driven gear 18, which generates a gear hitting sound. More specifically, the gears tend to strike one another at the maximum and minimum rotational speeds observed during these variations, That is, at the peaks and valleys of the frequency variations shown in FIG. 11. The gear hitting sound is the loudest at the valleys of the frequency variation. That is, when the relative rotational speed of the crank shaft 1 is lowest. This is apparent from the lower graph in FIG. 11 which shows that the vibration of the housing is the largest at this timing, The increase in the gear hitting sound is believed to occur for the following reason.

Figure 13:
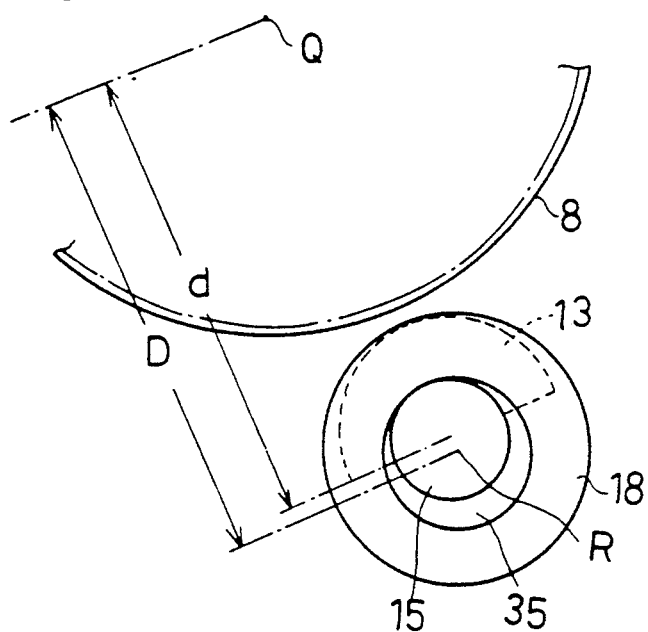
FIG. 13 is a schematic diagram illustrating the supporting portion of a support shaft when the drive gear is at its maximum rotational speed.

In the balancer apparatus, the weight 13 is generally positioned such that if furthest from the drive gear 8 when the relative rotational, speed of the drive gear 8 is at its minimum. This can be seen in FIG. 12. When the relative rotational speed of the drive gear 8 is at its maximum, the weight 13 comes closest to the drive gear 8, as shown in FIG. 13.

According to this embodiment, the gear ratio of the drive gear 8 to the driven gear 18 is 2:1. In addition, the inner diameter of each bushing 22 is slightly larger than the outer diameter of the support shaft 15 to permit lubricating oil to enter the clearance 35. We believe that the existence of the clearance 35 causes a gap d between the axial center Q of the drive gear 8 and the axial center R of the support shaft 15 to change in accordance with a variation in the rotational speed of the drive gear 8. That is, a gap D between the axial center Q and the center C of the bushing 22 is always constant. When the relative rotational speed of the drive gear 8 is at its maximum as in FIG. 13, however, the support shaft 15 comes closest to the drive gear 8 due to the inertial force of the weight 18 and the gap d becomes smaller than the gap D. When the relative rotational speed of the drive gear 8 is at its minimum as in FIG. 12, the support shaft 15 moves away from the drive gear 8 most and the gap d becomes greater than the gap D. The increase in this gap d seems to increase the backlash between the drive gear 8 and the driven gear 18. This results in generation of the largest gear-hitting sound when the relative rotational speed of the drive gear 8 is the lowest.

Figure 14:
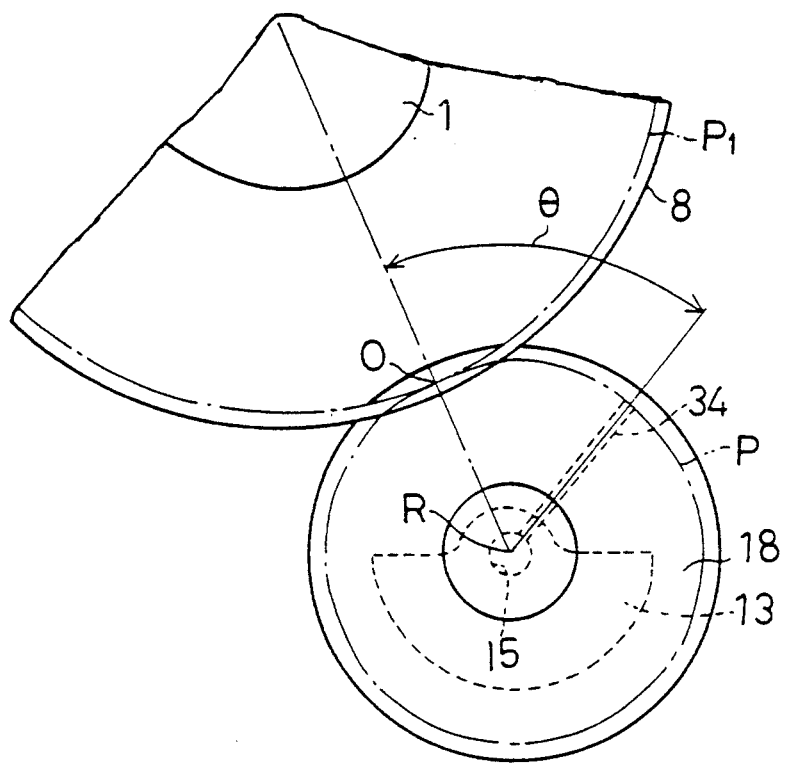
FIG. 14 is a fragmentary front view showing how the drive gear engages the driven gear when the first cylinder of the engine is positioned at the top dead center of a support wheel.
Figure 15:
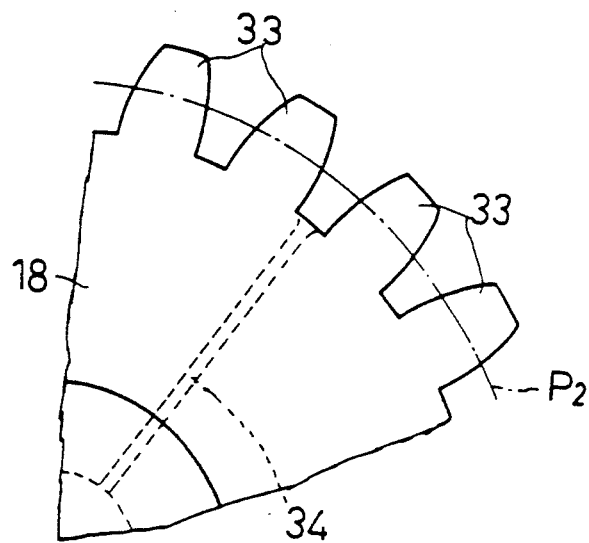
FIG. 15 is an enlarged diagram illustrating the essential part of the engagement shown in FIG. 14.

FIG. 14 illustrates how the drive gear 8 engages the driven gear 18 when the first cylinder of the engine is at the top dead center of the cylinder. After the crank shaft 1 turns about 30° of the crank angle with the cross point O between a pitch circle P1 of the drive gear 8 and a pitch circle P2 of the driven gear 18 as a reference, the end portion of -he lubrication oil supply path 34 is open to a teeth portion 33 where the driven gear 18 engages the drive gear 8. In this embodiment the position of the drive gear 8 after about 30 degrees of the crank angle is the position shifted by an angle of $\theta$ (about 60°) in the reverse direction of the driven gear with the line connecting the cross point O and the axial center R of the support shaft 15 taken as a reference. This opening position is where the teeth portion 33 (FIG. 5) of the driven gear 18 that engages with the drive gear 8 is positioned when the rotational speed of the drive gear 8 is at its minimum. The other end of the lubrication oil supply path 34 extends inward in the radial direction of the driven gear 18, communicating with the oil passage.

Since the driven gear 18 rotates twice the speed of the drive gear 8, the rotational speed of the crank shaft 1 and the drive gear 8 becomes lowest when the teeth portion 33 of the driven gear 18 engages the drive gear 8 at the position lagging about 60° from the cross point O between the pitch circles P1 and P2 when the first cylinder has reached the dead center. At this time, the direction of the load acting on the teeth of the teeth portion of the engaging portion between the gears 8 and 18 is reversed.

At this timing the weight 13 is located far apart from the drive gear 8. Since the clearance 35 for supplying the lubrication oil exists between the support shaft 15 and the bushing 22, the inertial force of the weight 13 deviates the support shaft 15 and the driven gear 18 to the position far apart from the drive gear 8, thus increasing the backlash between the teeth portions at the engaging portion. According to this embodiment, however, the teeth portion 33 of the driven gear 18 to which the lubrication oil supply path 34 is open engages with the drive gear 8. As a result, the oil supplied to the path 34 from the oil source is sprayed to the engaging portion from the opening of the path 34. The damping effect of the sprayed lubrication oil suppresses the generation of the gear hitting sound caused by the rotational change of the crank shaft 1. According to this embodiment, as described above, the lubrication oil is supplied only to the portion where the gear-hitting sound is generated by the rotational change of the crank shaft 1. Unlike the prior art technique of always supplying the lubrication oil to the power transmitting portions, therefore, this embodiment can efficiently suppress the generation of the gear hitting sound.

Figure 16:
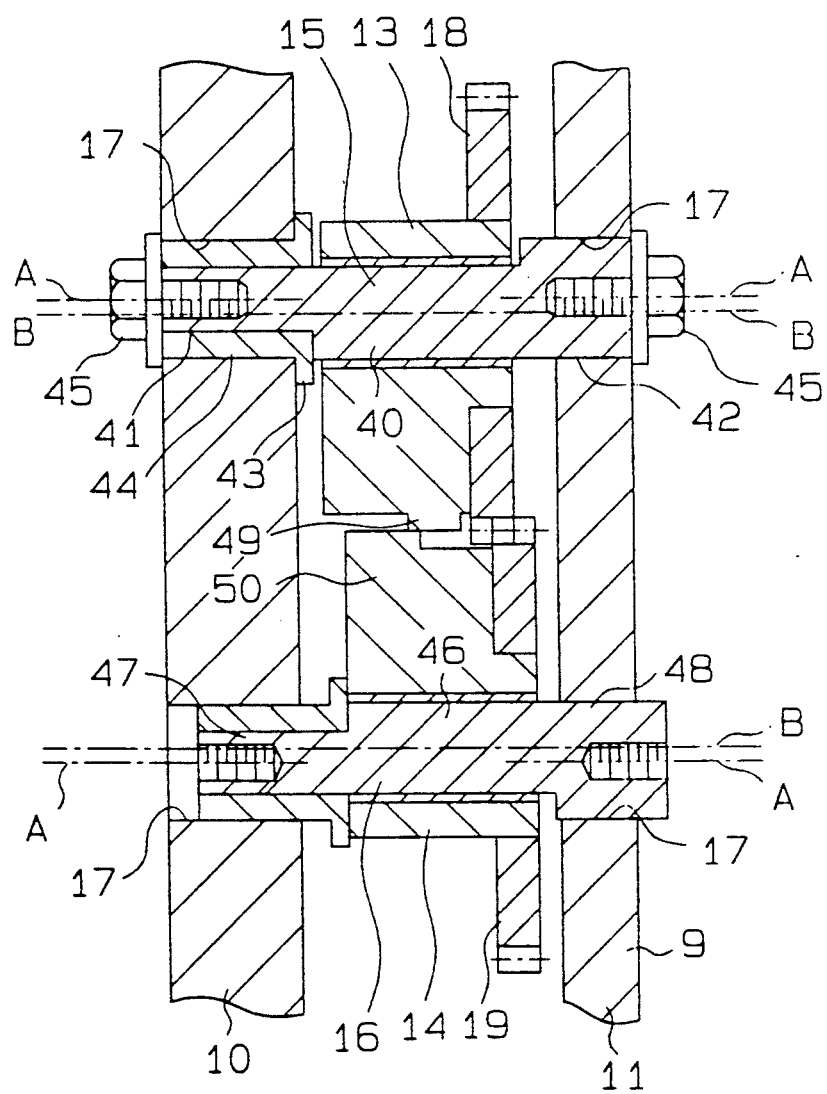
FIG. 16 is a fragmentary cross sectional view of a balancer apparatus according to a fifth embodiment of the present invention, before adjusting the clearance between the first and second driven gears.
Figure 17:
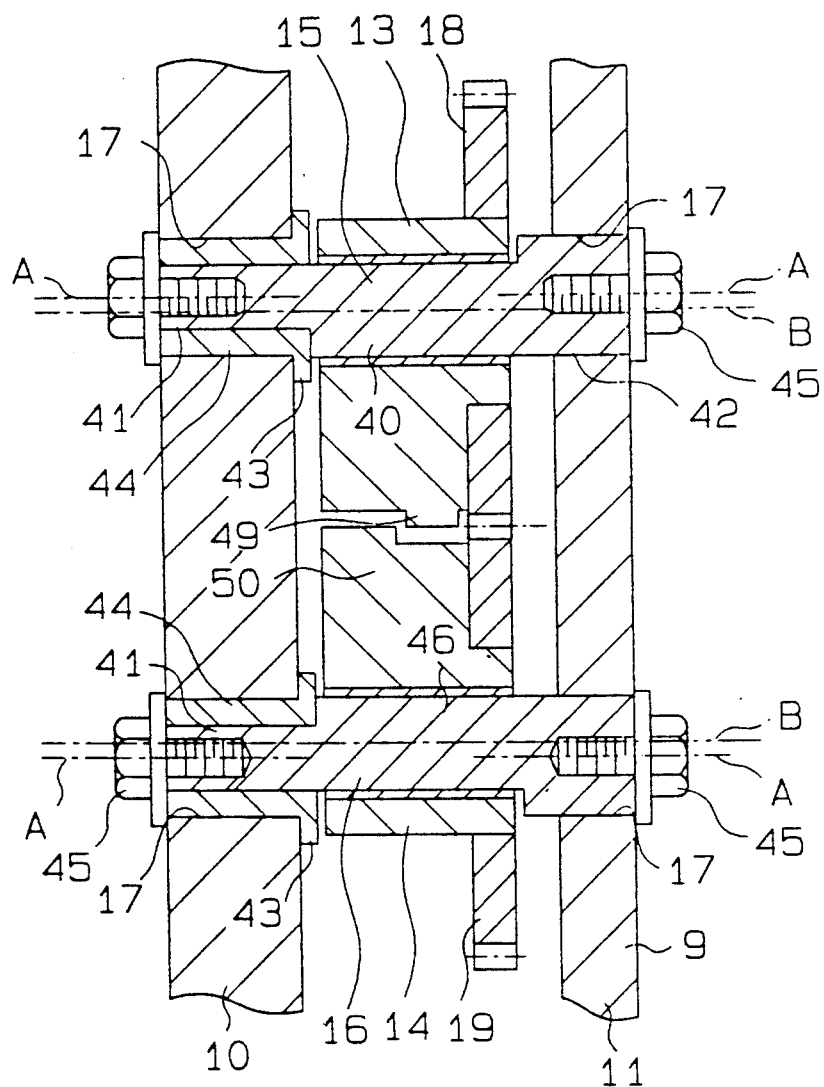
FIG. 17 is a fragmentary cross section of the balancer apparatus after the clearance between the first and second driven gears is adjusted.

Referring now to FIGS. 16 and 17, a fifth embodiment of the present invention will be described below. In this embodiment the clearances between the drive gear 8 and the first driven gear 18 and between the first and second driven gears 18 and 19 are designed to be adjustable.

A holding portion 40 to be fitted over the first weight 13 is formed in the center portion of the first support shaft 15. Attaching portions 41 and 42 are formed at the front and rear portions of the support shaft 15. A sleeve 44 with a flange 43 is put on the front attaching portion 41. The axial centers A of both attaching portions 41 and 42 are set on the same axial line, and are eccentric to the axial center B of the holding portion 40, The amount of eccentricity between both axial centers A and B is set to about 3 mm in this embodiment.

The attaching portions 41 and 42 are fastened to the front and rear plates 10 and 11 by means of bolts 45 in such a way that they can neither come off nor rotate. Before fastening the first support shaft 15 by means of the bolts 45, the support shaft 15 is rotatable, and rotation of the support shaft 15 can shift the rotational center of the weight 13 and the first driven gear 18.

As in the case of the first support shaft 15, a holding portion 46 to be fitted over the second weight 14 is formed in the center portion of the second support shaft 16, and attaching portions 47 and 48 are formed at the front and rear portions of the support shaft 16. The axial centers A of both attaching portions 47 and 48 are set coaxially, and are eccentric to the axial center B of the holding portion 46. Before fastening the second support shaft 16, the support shaft 16 is rotatable.

Further, a rear outer surface 49 of the first weight 13 and a front outer surface 50 of the second weight 14 are formed to have a larger diameter than the other portions in this embodiment. The large-diameter portions serve as gauges to facilitate the adjustment of the gap between the first and second driven gears 18 and 19.

The adjustment of the gaps between the gears 8, 18 and 19 at the time the balancer apparatus is mounted is performed in the following manner. First, as shown in FIG. 16, both support shafts 15 and 16 on which the weights 13 and 14 and the driven gears 18 and 19 are mounted are attached to the case 9. At this time, the front and rear bolts 45 are set loose to permit the first support shaft 15 to rotate with respect to the case 9. The bolts 45 are removed from the front and rear ends of the second support shaft 16, and the support shaft 16 is moved slightly backward from the front and rear holes 17 in the case 9 in this condition. At this time, the bolt 45 may be fastened to the rear end of the support shaft 16.

Subsequently, after the case 9 with both support shafts 15 and 16 attached thereto in the above manner is secured to a predetermined position of the cylinder block B, the first support shaft 15 is rotated. As the axial center B of the holding portion 40 of the support shaft 15 is eccentric to the axial centers A of the attaching portions 41 and 42, rotating the support shaft 15 in the above condition shifts the rotational center of the driven gear 18 and the weight 13. When the gap between the driven gear 18 and the drive gear 8 falls within an allowable range (in which the backlash does not exceed its allowable range) by this displacement, the rotation of the support shaft 15 is stopped, and the front and rear bolts 45 are fastened to secure the support shaft 15 unrotatable.

Then, the gauge 49 of the first weight 13 and the gauge 50 of the second weight 14, and the second support shaft 16 are rotated to permit the gauge 49 to contact the gauge 50. When both gauges 49 and 50 come into contact with each other, the distance between the axes of the first and second weights 13 and 14 becomes a predetermined value. In this condition, the second support shaft 16 is fitted further in the front and rear holes 17 together with the second weight 14 and the second driven gear 19. As a result, the second driven gear 19 engages with the first driven gear 18 with a given gap therebetween, and both gauges 49 and 50 are moved away from each other. When the second support shaft 16 is inserted to a predetermined position in both holes 51, the support shaft 16 is fastened to the case 9 by means of the bolts 45. This completes the adjustment of the gaps between the individual gears 8, 18 and 19.

In short, according to this embodiment, the axial centers B of the holding portions 40 and 46 of the first and second support shafts 15 and 16 are set eccentric to the axial centers A of the front and rear attaching portions 41 and 42, and 47 and 48. A very simple work of rotating the support shafts 15 and 16 can accurately adjust the gaps between the gears 8, 18 and 19. This can therefore eliminate the need for troublesome shim adjustments, and the production and preparation of many types of shims as required in the prior art.

Particularly, since the gauges 49 and 50 are formed on the outer surfaces of the respective weights 13 and 14 according to this embodiment, a simple work of making both gauges 49 and 50 contact each other can accurately adjust the gap between both driven gears 18 and 19 as well as adjust the distance between the axes of both weights 13 and 14.

Further, because the gap adjustment can be performed in the above-described manner, unlike in the prior art, it is unnecessary to work the attaching face of the case 9 to be attached to the cylinder block B and the holes 17 at a high precision.

A sixth embodiment of the present invention will be described below referring to FIGS. 18 and 19. According to this embodiment, the case 9 is formed of a light alloy, such as an aluminum alloy or magnesium alloy, in order to make the overall balancer apparatus lighter. These light alloys have a good thermal conductivity and a large coefficient of thermal expansion as well as a low specific gravity. In this embodiment an aluminum alloy with a coefficient of thermal expansion of $2.39 \times 10^{-5}$ is used as the light alloy.

Both end portions of each of the support shafts 15 and 16 are pressed with force into the front and rear holes 17 of the case 9 with a ring-shaped bushing 52 of a shape memory alloy placed therebetween.

A shape memory alloy has such a property that once this alloy is formed into a predetermined shape and subjected to a heat treatment, even if this alloy is deformed, it will return to the original shape acquired at the time of the heat treatment before the deformation when heated up to or above a predetermined temperature. Shape memory alloys include Ni-Ti alloys and Cu-Zn-Al alloys. While the bushing 52 in this embodiment is deformed in a cylindrical shape as shown in FIG. 18 in a cold period such as the time when the engine starts, it will become a hexagonal cylinder (non-circular shape) as shown in FIG. 19 in a warm period, such as the time the engine is running.

Further, both support shafts 15 and 16 are formed approximately columnar of steel in order to keep a sufficient strength. The steel generally has a smaller coefficient of thermal expansion than an aluminum alloy.

Figure 18:
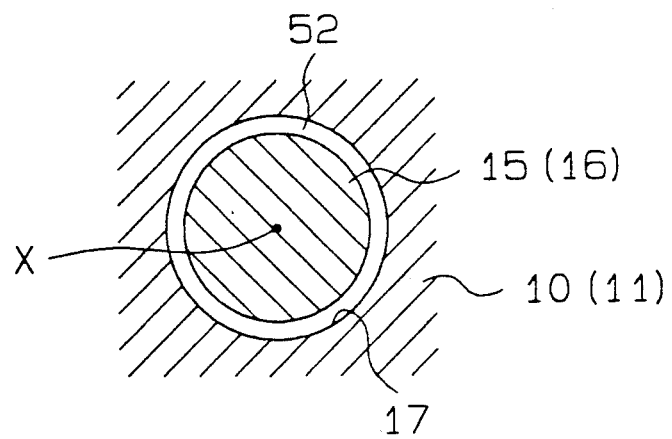
FIG. 18 is a fragmentary cross sectional view showing how the support shaft is secured when it is cooled.

In the cold period, as shown in FIG. 18, since there are no gaps between the outer surfaces of the support shafts 15 and 16 and the inner walls of the bushing 52, nor between the outer walls of the bushings 52 and the inner walls of the holes 17, the support shafts 15 and 16 become unrotatable to the case 9.

Figure 19:
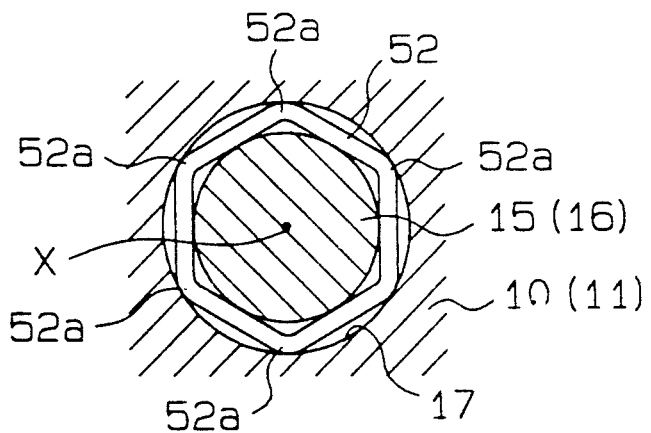
FIG. 19 is a fragmentary cross sectional view showing how the support shaft is secured when it is warmed.
Figure 20:
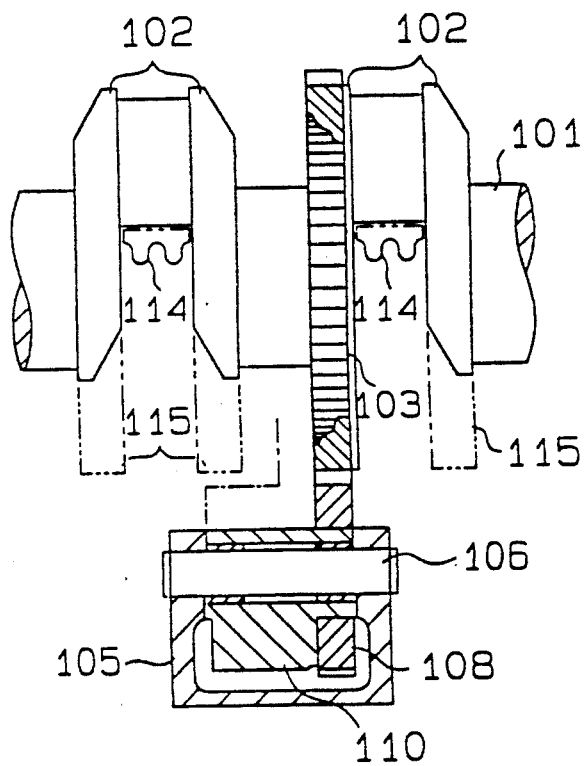
FIG. 20 is a diagram illustrating a conventional balancer apparatus.
Figure 21:
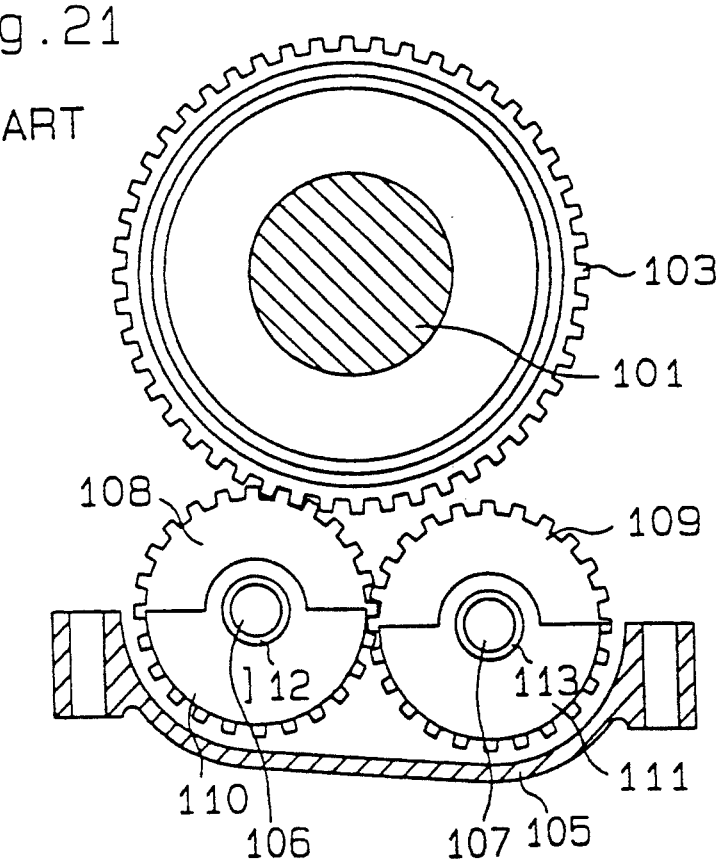
FIG. 21 is a cross section of the balancer apparatus in FIG. 20.

In the warm period, as shown in FIG. 19, the holes 17 become larger than the support shafts 15 and 16 due to the difference in the coefficient of thermal expansion therebetween to form gaps between the outer surfaces of the end portions of the support shafts 15 and 16 and the inner walls of the holes 17. At this time the bushings 52 expand and deform into a previously memorized hexagonal cylindrical shape to fill the gaps. Then, bending portions 52a of each bushing 52 formed between adjoining outer surfaces of the bushing 52 press the inner wall of the associated hole 17. At the same time the nearly center portion of each inner surface of the bushing 52 press against the outer surface of the end portions of each support shaft 15 or 16. The pressure of the bushing 52 is high enough not to cause any problem on the strengths of the bushing 52 and the case 9.

Further, the bushing 52 deforms into a hexagonal cylinder in the warm period as mentioned above. That is, it deforms into a shape of point symmetrical with the axial center X of the bushing 52 as the center. The axial center X of the bushing 52 does not therefore change its position during either the cold period or the warm period. This feature prevents the axial center of the support shaft 15 in the bushing 52 from shifting (being eccentric).

According to this embodiment, as described above, the cylindrical bushings 52 of a shape memory alloy are placed between the holes 17 and the support shafts 15 and 16, respectively, to render both support shafts 15 and 16 unrotatable in the holes 17 of the case 9 in the cold period as well as in the warm period. The support shafts 15 and 16 will therefore neither become loose nor have their axial centers become eccentric. As the bushings 52 are placed in the holes 17 of the case 9, no special space is required for the bushings 52.

Since the case 9 has a higher coefficient of thermal expansion than the support shafts 15 and 16, the holes 17 always expand in the warm period. Therefore, the thermal expansion of the support shafts 15 and 16 will not crack the case 9. In addition, the support shafts 15 and 16 are made of steel and the case 9 of an aluminum alloy, as described earlier, the balancer apparatus can be made significantly lighter as compared with the case where the case 9 is made of steel or cast iron.

The bushings 52 in this embodiment may be made of a shape memory alloy which takes a shape other than a hexagonal cylinder in the warm period. Further, the cross sections of the support shafts 15 and 16 may take other shapes than a circular cross section. These bushings 52 and support shafts 15 and 16 may properly be combined when needed.

What is claimed is:

1. An engine including a balancer apparatus for suppressing vibrations in the engine, wherein the engine has a rotatable crankshaft and a plurality of pistons and cylinders for causing rotation of the crankshaft, the balancer apparatus comprising:

a drive gear mounted substantially at the center of the longitudinal direction of the crank shaft for the rotation with the crank shaft, the drive gear being a helical gear; and a first driven gear for supporting a first weight when engaged with a drive gear, the first driven gear also being a helical gear;

a first support shaft for rotatably supporting the first driven gear and the first weight;

a case for non-rotatably supporting the first support shaft, the case having a first wall that receives the thrust induced by rotation of the drive gear;

a first oil passage for delivering lubricating oil to the junction between the first weight and the first support shaft; and a guide passage in communication with the oil passage, for delivering lubrication oil to the portion of the first wall that receives the thrust induced by rotation on the drive gear.

2. An engine according to claim 1, wherein the balancer apparatus further comprises a first driven gear bushing journaled about said first support shaft and carrying said first driven gear and said first weight, the first driven gear bushing being formed from a rolled plate having end portions that are joined together, the joined end portions facing said first weight and each being bevelled such that the first driven gear bushing has a chamfer at an interior surface of a region where the end portions are joined.

3. An engine according to claim 1, wherein the case has an opening that receives said first support shaft and the case is made of a material having a higher coefficient thermal expansion than said first support shaft, the balancer apparatus further comprising a shaft supporting bushing for holding the first support shaft in the opening, the shaft supporting bushing being formed of a shape memory alloy which expands and deforms into a non-cylindrical shape when the engine is warm.

4. An engine according to claim 1, wherein said first support shaft has a first portion that is attached to the case and a second portion that carries the weight, the axial centers of the first and second portions being offset such that the first and second portions are eccentric.

5. An engine according to claim 1, wherein the balancer apparatus further comprises a second oil passage formed in at least one of the drive gear and said first driven gear, the second oil passage opening to a position where the drive gear and said first driven gear engage at a position wherein the crankshaft is rotated approximately 30° from a position where one of the pistons is at dead center position.

6. An engine according to claim 1, wherein the balancer apparatus further comprises a second driven gear engageable with the first driven gear, for supporting a second weight.

7. An engine according to claim 1, wherein the case is generally rectangular and includes a second wall opposite the first wall, wherein the first wall is thicker than the second wall.

* * * * *